US006928352B2

(12) United States Patent
Yao et al.

(10) Patent No.: US 6,928,352 B2
(45) Date of Patent: Aug. 9, 2005

(54) SYSTEM AND METHOD OF INITIAL ALIGNING WHEELS OF VEHICLE STEER-BY-WIRE SYSTEMS

(75) Inventors: Yixin Yao, Ann Arbor, MI (US); Gregory J. Stout, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 44 days.

(21) Appl. No.: 10/370,891

(22) Filed: Feb. 20, 2003

(65) Prior Publication Data

US 2004/0167693 A1 Aug. 26, 2004

(51) Int. Cl.[7] .............................................. B62D 11/00
(52) U.S. Cl. ....................................................... 701/41
(58) Field of Search ...................... 701/41–42; 180/405, 180/411

(56) References Cited

U.S. PATENT DOCUMENTS

| 4,930,084 A | 5/1990 | Hosaka et al. |
| 5,180,214 A | 1/1993 | Yeh et al. |
| 6,370,460 B1 * | 4/2002 | Kaufmann et al. ........... 701/41 |
| 2003/0028302 A1 * | 2/2003 | Sebastian et al. ............. 701/41 |

* cited by examiner

*Primary Examiner*—Thu V. Nguyen
(74) *Attorney, Agent, or Firm*—Brinks Hofer Gilson & Lione

(57) ABSTRACT

The present invention involves a method and system of initial aligning wheels of vehicle steer-by-wire systems with two independent front road wheels in the real time. The method comprises providing a steering wheel control sub-system and a road wheel control sub-system, providing an initial alignment unit and procedure to align the road wheels and steering wheel, and receiving relative and absolute steering wheel angles and road wheel angles. The method further includes generating wheel aligning reference angles based on the relative and absolute wheel angle, generating the switch control signal based wheel aligning reference angles using the logic operation with the threshold, and determining the steer-by-wire systems in the control state or in the initial alignment state.

16 Claims, 4 Drawing Sheets

SYSTEM AND METHOD OF INITIAL ALIGNING WHEELS OF VEHICLE STEER-BY-WIRE SYSTEMS

BACKGROUND OF THE INVENTION

The present invention relates to a system and method of initial aligning wheels of vehicle steer-by-wire systems in real time.

In steer-by-wire systems, mechanical linkages between the steering wheel and the front road wheels have been eliminated. Moreover, the mechanical linkages between the two front road wheels are also eliminated in some steer-by-wire systems. Instead, two independent road wheel electric motor actuators are installed on the vehicle, wherein each actuator independently actuates one of the front road wheels. This allows the two front road wheels be able to move independently from each other. Moreover, a steering wheel electric motor actuator is also used to connect to vehicle steering wheel for providing the familiar steering feel and the steering command to the road wheel.

There is a need for a steer-by-wire system to have control of the road wheels and steering wheel of the vehicle to implement initial alignment. The initial alignment between the steering wheel and two road wheels should be implemented in an initial state when the steer-by-wire system is powered on and is initialized. Before the aligning wheels of steer-by-wire system, angular positions of the steering wheel and two road wheels are not determined because there are no mechanical connections.

BRIEF SUMMARY OF THE INVENTION

In order to implement the initial alignment between the steering wheel and between two road wheels in the real time, the absolute angular positions of the steering wheel and road wheels should be determined and a certain alignment strategy should be development to control the steering wheel and road wheels to the desired angular positions in the process of initialization process of the steer-by-wire system.

It is an important task to implement the initial alignment between the steering wheel and two road wheels. If not, then offsets between the steering wheel and two road wheels may occur. It is therefore one aspect of the present invention to provide for a system and method of aligning steering wheel and road wheels in real time in the steer-by-wire system. It is further object of the present invention to provide for a system and method for real-time alignment by using a real-time alignment technology based on the steer-by-wire control system. It is a further aspect of the present invention to provide for a procedure for real-time initial alignment of steer-by-wire systems.

The present invention generally provides a system and method of aligning wheels of vehicle steer-by-wire systems with two independent front road wheels. The steer-by-wire system in accordance with the present invention may be viewed as having two parts: a steering wheel sub-system and a road wheel sub-system with two independent front road wheels. Electrical signals are transmitted via electrical wires to link the steering wheel sub-system to the road wheel sub-system. Main functions of the steering wheel sub-system are to provide a steering directional reference angle and produce an appropriate steering feel to a driver of the vehicle. Main functions of the road wheel sub-system are to establish tracking between road wheel angles and a steering wheel angle reference input which is provided by the steering wheel sub-system. These two subsystems are integrated as the steer-by-wire system and are designed by using control system design methods to implement vehicle steering functions.

To determine the absolute angles of the steering wheel and road wheels, one absolute steering angle sensor and two absolute road wheel angle sensors are installed in the steering wheel sub-system and road wheel sub-system, respectively. Based on the measurements of absolute steering wheel angle and absolute road wheel angles, an initial alignment system and method in the real time are implemented in the steer-by-wire system including the steering wheel sub-system and road wheel sub-system.

The real time initial alignment system and method changes the reference input signals of the steering wheel control sub-system and the road wheel control sub-system. The structure and parameters of the steering wheel control sub-system and road wheel control sub-system are not affected by the initial alignment. Thus, the initial alignment avoids applying the complex control system structure to achieve an aspect of initial alignment of the steer-by-wire system.

It is not necessary to consider the signs of the absolute and relative wheel angles using this invention. Moreover, the return rates of the steering wheel and road wheels in the process of initial alignment can be adjustable. By adjusting the relative gains of the steering wheel control sub-system and road wheel control sub-system, the wheel rates in the initial alignment will be adjusted according to the rate requirements.

Further aspects, features and advantages of the invention will become apparent from consideration of the following erudite description and the appended claims when taken in connection with the accompanying drawings.

DETAILED DESCRIPTION OF THE INVENTION

Figure 1:
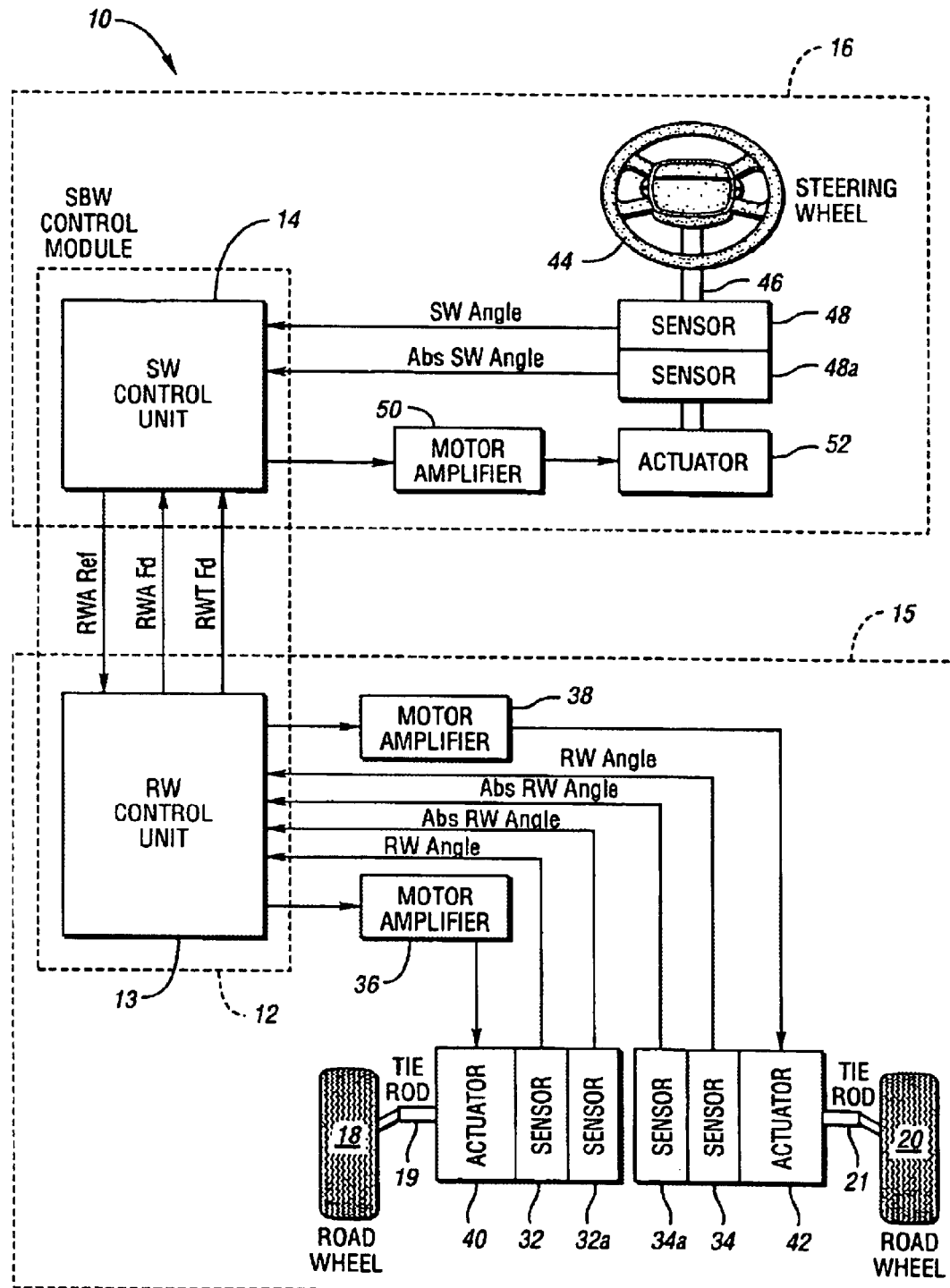
FIG. 1 is a schematic diagram of a vehicle steer-by-wire system assembly in accordance with the present invention.

FIG. 1 illustrates a vehicle steer-by-wire system 10 in accordance with the present invention. As shown, the vehicle steer-by-wire system 10 has dependent left and right front road wheels. As shown in FIG. 1, steer-by-wire system 10 is composed of a road wheel subsystem 15 and a steering wheel system 16. Steer-by-wire system 10 includes steer-by-wire control module 12 having a road wheel controller 13 of a road wheel sub-system 15 and a steering wheel controller 14 of a steering wheel sub-system 16. Steer-by-wire control module 12 links road wheel sub-system 15 and steering wheel sub-system 16.

As shown in FIG. 1, road wheel sub-system 15 includes left road wheel 18 connected to a left tie rod 19 and right road wheel 20 connected to a right tie rod 21. Road wheel sub-system 15 further includes left and right road wheel actuators 40, 42 in electrical communication with left and right motor amplifiers 36, 38, respectively. Left and right motor amplifiers 36, 38 for receiving control signals from road wheel controller 13. Actuators 40, 42 receive current signals from respective amplifiers 36, 38 to produce torques on the left and right road wheels 18 and 20, respectively. Left road wheel angle sensor 32 is attached to left road wheel actuator 40 to sense left road wheel angle. Right road wheel angle sensor 34 is attached to right road wheel actuator 42 to sense right road wheel angle. Left and right road wheel sensors 32, 34 are in electrical communication with road wheel controller 13 for sending signals indicative of left and right road wheels angles to be processed by controller 13. Road wheel controller 13 receives a plurality of input signals to produce road wheel control signals to control the left and right road wheels 18, 20 using actuators 40, 42, respectively.

Sensors 32 and 34 provide generally relative angle measurements. In order to implement the initial alignment and to be the redundant road wheel angle sensors, the absolute angle sensors are used. Absolute left road wheel angle sensor 32a is attached to left road wheel actuator 40 to sense absolute left road wheel angle. Absolute right road wheel angle sensor 34a is attached to right road wheel actuator 42 to sense absolute right road wheel angle. Absolute left and right road wheel sensors 32a, 34a are in electrical communication with road wheel controller 13 for sending signals indicative of absolute left and right road wheels angles to be processed by controller 13.

In a conventional steering system of a vehicle with typical mechanical connections, a road wheel will directly receive steering wheel inputs from the steering wheel of the vehicle. Moreover, the road wheel angles will mechanically track the steering wheel angle. In the steer-by-wire system with the above road wheel sub-system 15 in accordance with the present invention, a steering angle signal may be transmitted to the road wheel sub-system electrically using wires. Therefore, one function of the road wheel sub-system 15 is to achieve tracking of the road wheel angles for a steering wheel reference angle. Furthermore, each road wheel angle should independently track the steering angle reference angle, and two road wheel angles do not affect each other. Such a tracking function may be realized by using control system design implemented in the road wheel controller 13 of the above-mentioned road wheel sub-system 15.

Steering wheel sub-system 16 includes steering wheel 44 mounted to steering shaft 46. In this embodiment, steering wheel sensor 48 is mounted to steering shaft 46 or steering wheel actuator 52 for sensing a steering wheel angle. Steering wheel sensor 48 is in electrical communication with steering wheel controller 14 which receives from sensor 48 signals indicative of steering wheel angle. Steering wheel sub-system 16 further includes steering wheel motor amplifier 50 which is in electrical communication with steering wheel controller 14 for receiving control signal and for providing a current signal to steering wheel actuator 52. Steering wheel actuator 52 is in electrical communication with motor amplifier 50 and is attached to steering shaft 46 for receiving current from amplifier 50 and for producing a reaction torque on the steering wheel 44. Steering wheel controller 14 receives steering wheel angle signal, road wheel angle signals, road wheel torque signal, and vehicle signals (not shown) and produces a steering wheel control signal.

Sensor 48 provides generally relative angle measurements. In order to implement the initial alignment and to be the redundant steering wheel angle sensor, the absolute angle sensor is used. Absolute steering wheel sensor 48a is mounted to steering shaft 46 or steering wheel actuator 52 for sensing an absolute steering wheel angle. Absolute steering wheel sensor 48a is in electrical communication with steering wheel controller 14 which receives from sensor 48a signals indicative of absolute steering wheel angle.

In a conventional steering system with mechanical connections, a vehicle driver directly controls the vehicle's direction by turning the steering wheel and obtains a steering feel through a resulting torque in the steering shaft. In the steer-by-wire system without mechanical connection between the steering wheel and road wheels in accordance with the present invention, a familiar steering feel can be produced by steering wheel control sub-system with feedback control structure. Therefore, main functions of the steering wheel sub-system 16 are to provide a realistic steering feel for the vehicle driver and a steering wheel angle reference signal for the road wheel sub-system 15. This function can be realized by using control system design method implemented in the steering wheel controller 14 of the above-mentioned steering wheel sub-system 16.

As shown in FIG. 1, steering wheel controller 14 is in electrical communication with road wheel controller 13. The controllers 13 and 14 are integrated in a steer-by-wire control module 12 to implement the steering functions mentioned above. The steer-by-wire control module 12 also receives additional vehicle signals, e.g., vehicle speed, yaw rate, and lateral acceleration. This may be accomplished by implementing vehicle speed, yaw rate, and lateral acceleration sensors on the vehicle. Moreover, the steer-by-wire control module 12 also includes the real-time initial alignment unit to implement the initial alignment in the real-time.

Figure 2:
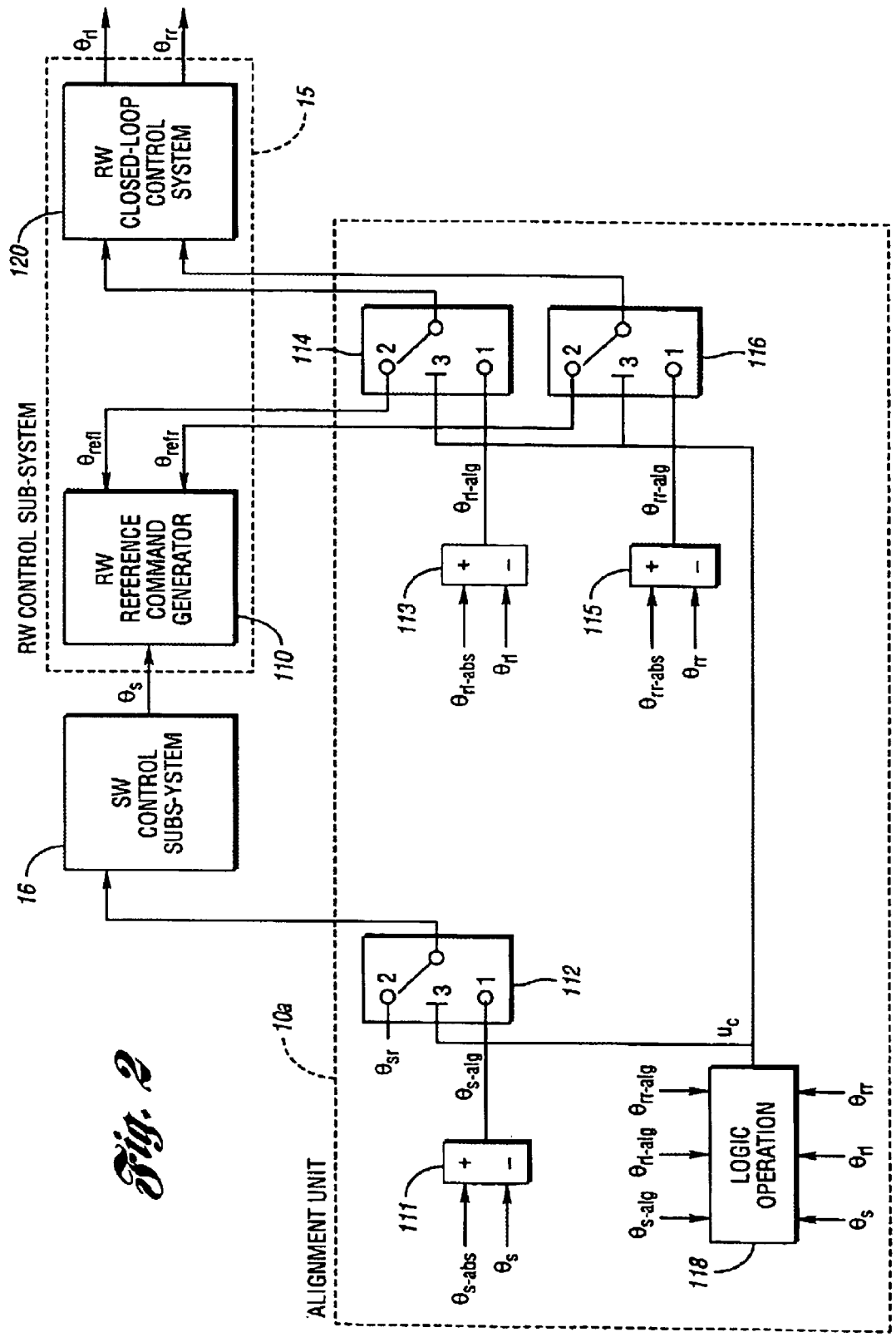
FIG. 2 is a block diagram of the initial alignment in the real time between the steering wheel and road wheel and between two road wheel in the steer-by-wire system.

FIG. 2 illustrates a block diagram of the steer-by-wire control system with the real-time initial alignment unit 10a for initial alignment between the left and right road wheels and between the steering wheel and the road wheels. As shown, the real-time initial alignment unit 10a provides input signals to the road wheel control sub-system 15 and the steering wheel control sub-system 16 in accordance with one embodiment of the present invention. The control system structure shown in FIG. 2, which is based on the steer-by-wire system assembly shown in FIG. 1, describes components with blocks and variable relationship among control variables, input and output variables, and reference variables.

As shown in FIG. 2, road wheel sub-system 15 includes reference command generator 110 which receives a steering wheel angle signal $\theta_s$ and vehicle signals. Such vehicle signals may include vehicle speed, yaw rate, and lateral acceleration. The reference command generator 110 determines left and right road wheel reference angles $\theta_{refl}$, $\theta_{refr}$, wherein the generator 110 uses an algorithm based on the steering wheel angle signal and the vehicle signals. The left road wheel reference angle $\theta_{refl}$ is indicative of a desired left road wheel angular position and the right road wheel reference angle $\theta_{refr}$ is indicative of a desired right road wheel angular position. The road wheel reference angles $\theta_{refl}$ and $\theta_{refr}$, may be the same or different values. The variable steering ratios between steering wheel angle signal $\theta_s$ and left and right road wheel reference angles $\theta_{refl}$, $\theta_{refr}$ are implemented in the reference command generator 110.

Road wheel sub-system 15 shown in FIG. 2 also includes the road wheel closed-loop control system 120 having the road wheel controlled plant and the road wheel controller 13. The road wheel controlled plant is referred to the road wheel system assembly including components depicted in FIG. 1 which include but are not limited to the road wheels, the motor amplifiers, the motor actuators, the relative and absolute road wheel angle sensors, and the tie rods. The road wheel closed-loop control system 120 implements the road wheel angles $\theta_{rl}$ and $\theta_{rr}$ tracking for the road wheel reference angles $\theta_{refl}$ and $\theta_{refr}$ by using road wheel controller 13.

FIG. 2 further illustrates steering wheel sub-system 16 which provides the steering wheel reference angle $\theta_s$ to the road wheel sub-system 15 and produces an appropriate steering feel for the vehicle driver. These steering functions of steering wheel system can be accomplished by using the feedback control. Steering wheel sub-system 16 is composed of a steering wheel controlled plant and steering wheel 14. The steering wheel controlled plant includes the steering wheel system assembly having components depicted in FIG. 1 which include but are not limited to the steering wheel, the motor amplifier, the motor actuator, the relative and absolute steering wheel angle sensors, and the steering wheel shaft. The steering wheel closed-loop control system implements the steering functions of providing the steering wheel reference angle and producing the steering feel for the vehicle driver by using road wheel controller 14.

As shown in FIG. 2, the steer-by-wire control system 10 includes the real-time initial alignment unit 10*a*. Initial alignment unit 10*a* receives the relative and absolute steering wheel and road wheel angles from the steering wheel control sub-system 16 and the road wheel control sub-system 15. Unit 10*a* includes signal summing operators 111, 113, 115 in communication with signal switches 112, 114, 116, respectively, and logic operation unit 118.

Signal summing operators 111 generates a steering wheel aligning reference angle $\theta_{s\text{-}alg}$ based on a relative steering wheel angle $\theta_s$ and absolute steering wheel angle $\theta_{s\text{-}abs}$ to be a reference angle input for the steering wheel control sub-system. Signal summing operators 113 generates a left road wheel aligning reference angle $\theta_{rl\text{-}alg}$ based on a relative left road wheel angle $\theta_{rl}$ and absolute left road wheel angle $\theta_{rl\text{-}abs}$ to be a left road wheel reference angle input for the road wheel closed-loop control system. Signal summing operators 115 generates a right road wheel aligning reference angle $\theta_{rr\text{-}alg}$ based on a relative right road wheel angle $\theta_{rr}$ and absolute right road wheel angle $\theta_{rr\text{-}abs}$ to be a right road wheel reference angle input for the road wheel closed-loop control system.

As shown in FIG. 2, signal switch 112 implements the signals switching between the steering wheel reference angle $\theta_{sr}$ and steering wheel aligning reference angle $\theta_{s\text{-}alg}$. Signal switch 114 implements the signals switching between the left road wheel reference angle $\theta_{rl}$ and left road wheel aligning reference angle $\theta_{rl\text{-}alg}$. Signal switch 116 implements the signals switching between the right road wheel reference angle $\theta_{rr}$ and right road wheel aligning reference angle $\theta_{rr\text{-}alg}$. The control signal of switches 112, 114, and 116 is provided by logic operation unit 118.

Logic operation unit 118 determines the positions of switches 112, 114, and 116 by providing a switch control signal. In this embodiment, the switch control signal of logic operation unit 118 determines working states of the steer-by-wire system: control state when the switches 112, 114, and 116 are in switch position 2, and initial alignment state when the switches 112, 114, and 116 are in switch position 1. In the control state, steering wheel control sub-system 16 is connected with the steering wheel reference angle $\theta_{sr}$, and road wheel closed-loop control system 120 is connected with left and right road wheel reference angle $\theta_{rl}$, $\theta_{rr}$. In the initial alignment state, steering wheel control sub-system 16 is connected with the steering wheel aligning reference angle $\theta_{s\text{-}alg}$, and road wheel closed-loop control system 120 is connected with left and right road wheel aligning reference angle $\theta_{rl\text{-}alg}$, $\theta_{rr\text{-}alg}$.

The switch control signal of logic operation unit 118 is determined by the logic operation based on the steering wheel and road wheel aligning reference angles $\theta_{s\text{-}alg}$, $\theta_{rl\text{-}alg}$, and $\theta_{rr\text{-}alg}$. The aligning reference angles $\theta_{s\text{-}alg}$, $\theta_{rl\text{-}alg}$, $\theta_{rr\text{-}alg}$ of the steering wheel and the road wheels are the differences between the relative angles and absolute angles. As an example, aligning reference angles are given as $\theta_{s\text{-}alg}=\theta_{s\text{-}abs}-\theta_s$, $\theta_{rl\text{-}alg}=\theta_{rl\text{-}abs}-\theta_{refl}$, and $\theta_{rr\text{-}alg}=\theta_{rr\text{-}abs}-\theta_{refr}$. The logic operation unit 118 generates the switch control signal according to differences between the relative angles and absolute angles by using the logic operation. For example, the switch control signal is generated by using threshold for the aligning reference angles. When the differences between the relative angles and absolute angles are larger than the threshold, such as 0.1 (deg), switch control signal give the logic value 0 and the switches are in position 1. When the differences between the relative angles and absolute angles are equal to or less than the threshold, such as 0.1 (deg), the switch control signal give the logic value 1 and the switches are switched to the position 1.

In this embodiment, the steer-by-wire control system works in the initial alignment state when the differences between the relative angles and absolute angles are larger then the threshold, and works in the control state when the differences between the relative angles and absolute angles are smaller than the threshold.

Steering wheel sub-system 16 and road wheel closed-loop control system 120 are designed with a function of tracking wheel angles for the reference input angle signals. Thus, the steering wheel and road wheel will track the steering wheel and road wheel aligning reference angles $\theta_{s\text{-}alg}$, $\theta_{rl\text{-}alg}$, and $\theta_{rr\text{-}alg}$ to the desired initial aligning angular positions to implement the alignment. The desired aligning angular positions can be the center or any angle of the steering wheel, such as the current steering wheel angle when the initial alignment procedure is executed.

In this embodiment, the desired aligning angular positions are determined by the steering wheel and road wheel aligning reference angles $\theta_{s\text{-}alg}$, $\theta_{rf\text{-}alg}$, and $\theta_{rr\text{-}alg}$. The general aligning reference angles are given as $$\theta_{s\text{-}alg}=\theta_{s\text{-}abs}-\theta_s+\theta_{init}$$

$$\theta_{ri\text{-}alg}=\theta_{rl\text{-}abs}-\theta_{rl}+\theta_{init}$$

$$\theta_{rr\text{-}alg}=\theta_{rr\text{-}abs}-\theta_{rr}+\theta_{init}$$

where $\theta_{init}$ is a constant to represent the desired aligning angular position. When $\theta_{init}=0$, initial aligning angle is zero and steering wheel and road wheels are in the center. The operation to obtain the general aligning reference angles $\theta_{s\text{-}alg}$, $\theta_{ri\text{-}alg}$, and $\theta_{rr\text{-}alg}$ can be implemented in the signal summing operators 111, 113, 115 of real-time initial alignment unit 10*a* shown in FIG. 2.

The initial alignment system and method in this invention shown in FIG. 2 changes the reference input signals of the steering wheel control sub-system and the road wheel closed-loop control system. The structure and parameters of the steering wheel control sub-system and road wheel closed-loop control system are not changed. Thus, this initial alignment system and method avoids applying the complex control system structure to achieve the purpose of initial alignment.

The rates of the steering wheel and road wheel to achieve the required angular positions in the process of the initial alignment can be adjusted according to the initial alignment response time requirement. This may be implemented by using the system and method in the present invention. In order to control the wheel rates in the process of initial alignment, steering wheel and road wheel aligning reference angles signals $e_{s\text{-}alg}$, $e_{ri\text{-}alg}$, and $e_{rr\text{-}alg}$ are used to be the scheduling signals for gains of the steering wheel control sub-system 16 and road wheel closed-loop control system 120 shown in the FIG. 2. When the gains increase based on the aligning reference angles signals, the wheel rates will increase. When the initial alignment process ends and aligning reference angles tends to the zero, the gains will become the normal values working in the control state.

Figure 3:
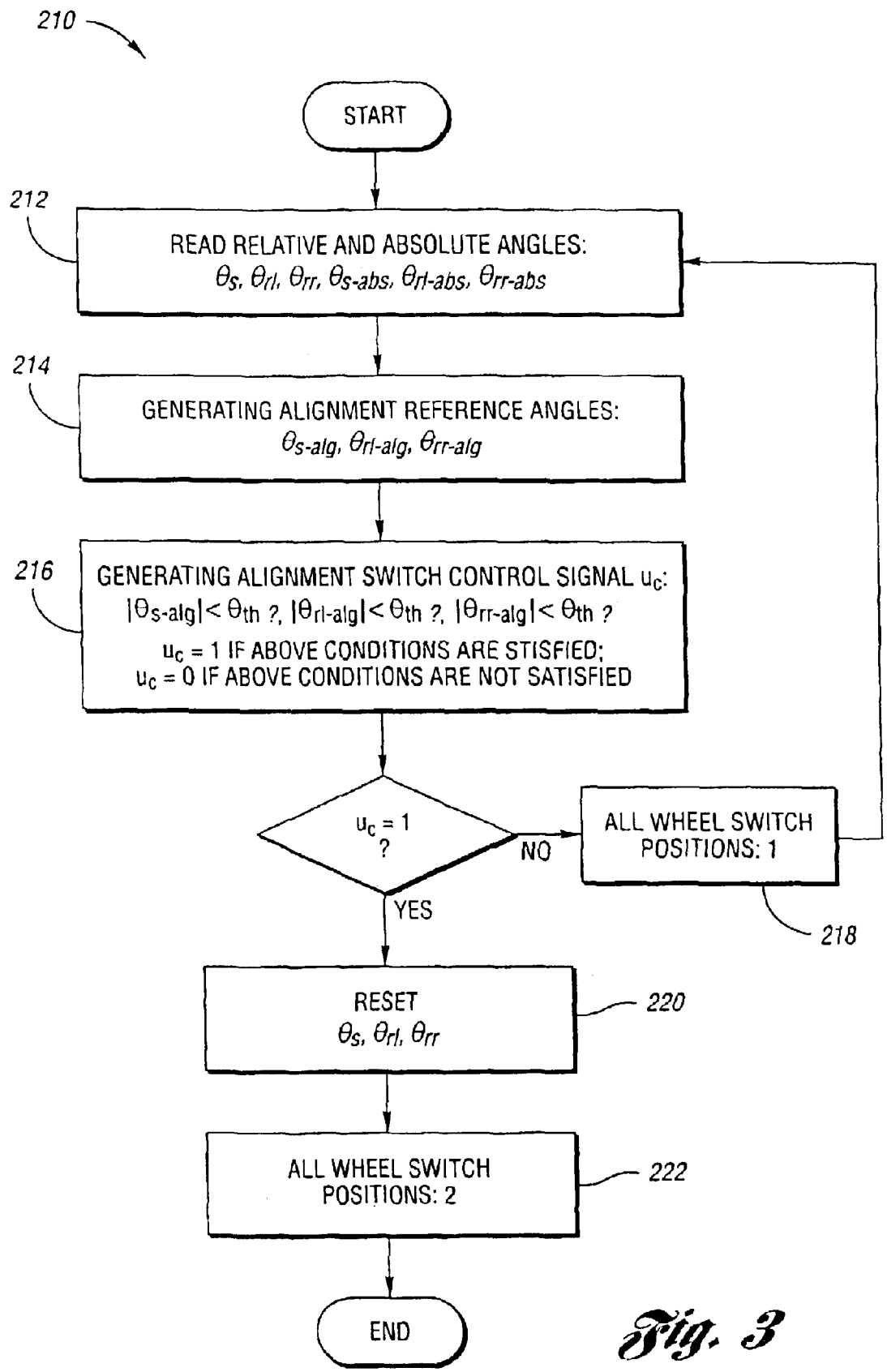
FIG. 3 is a flow chart diagram of the real time initial alignment procedure.

FIG. 3 is a flowchart diagram illustrating one general method 210 of the real time initial alignment in the present invention. The method 210 depicts general routine procedure to be performed during operation of the real time initial alignment in the steer-by-wire system of FIG. 2. As shown, method 210 is performed to produce the wheel aligning reference angles and the switch control signals to determine the work state of steer-by-wire system. When the steer-by-wire system operates in the initial alignment state, the initial alignment between steering wheel angle and road wheel angles, and between left and right road wheel angles, is implemented. When the steer-by-wire system operates in the control state, the steer-by-wire system is controlled to maintain the alignment between the steering wheel and road wheels.

The method comprises sensing the relative steering wheel angle $\theta_s$, relative left road wheel angle $\theta_{rl}$ and right road wheel angle $\theta_{rr}$, and absolute steering wheel angle $\theta_{s\text{-}alg}$, absolute left road wheel angle $\theta_{rl\text{-}abs}$ and absolute right road wheel angle $\theta_{rr\text{-}abs}$ in box 212. The method includes generating the steering wheel aligning reference angle $\theta_{s\text{-}alg}$ based on the relative steering wheel angle $\theta_s$ and absolute steering wheel angle $\theta_{s\text{-}abs}$, left road wheel aligning reference angle $\theta_{rl\text{-}alg}$ based on the relative left road wheel angle $\theta_{rl}$ and absolute left road wheel angle $\theta_{rl\text{-}abs}$, and right road wheel aligning reference angle $\theta_{rr\text{-}alg}$ based on the relative right road wheel angle $\theta_{rr}$ and absolute right road wheel angle $\theta_{rr\text{-}abs}$ in box 214. The method 210 further includes generating the switch control signal $u_c$ according to differences between the relative angles and absolute angles by using the logic operation with the threshold in box 216.

The method further comprises determining switch positions with the switch control signal $u_c=1$ in the control state and with the switch control signal $u_c=0$ in the initial alignment state in box 217. In the control state with $u_c=1$, the relative wheel angles including the relative steering wheel angle $\theta_s$, left road wheel angle $\theta_{rl}$ and right road wheel angle $\theta_{rr}$ are reset in box 220. Then, the steering wheel reference angle $\theta_{sr}$ and left and right road wheel reference angle $\theta_{refl}$, $\theta_{refr}$ are connected to the steer-by-wire control system to be inputs such that the steer-by-wire control system executes the normal steering control in box 222. In the initial alignment state with $u_c=0$, the steering wheel aligning reference angle $\theta_{s\text{-}alg}$ and left and right road wheel aligning reference angle $\theta_{rl\text{-}alg}$, $\theta_{rr\text{-}alg}$ are connected to the steer-by-wire control system to be inputs such that the steer-by-wire control system executes the initial alignment of wheels in box 218.

Figure 4:
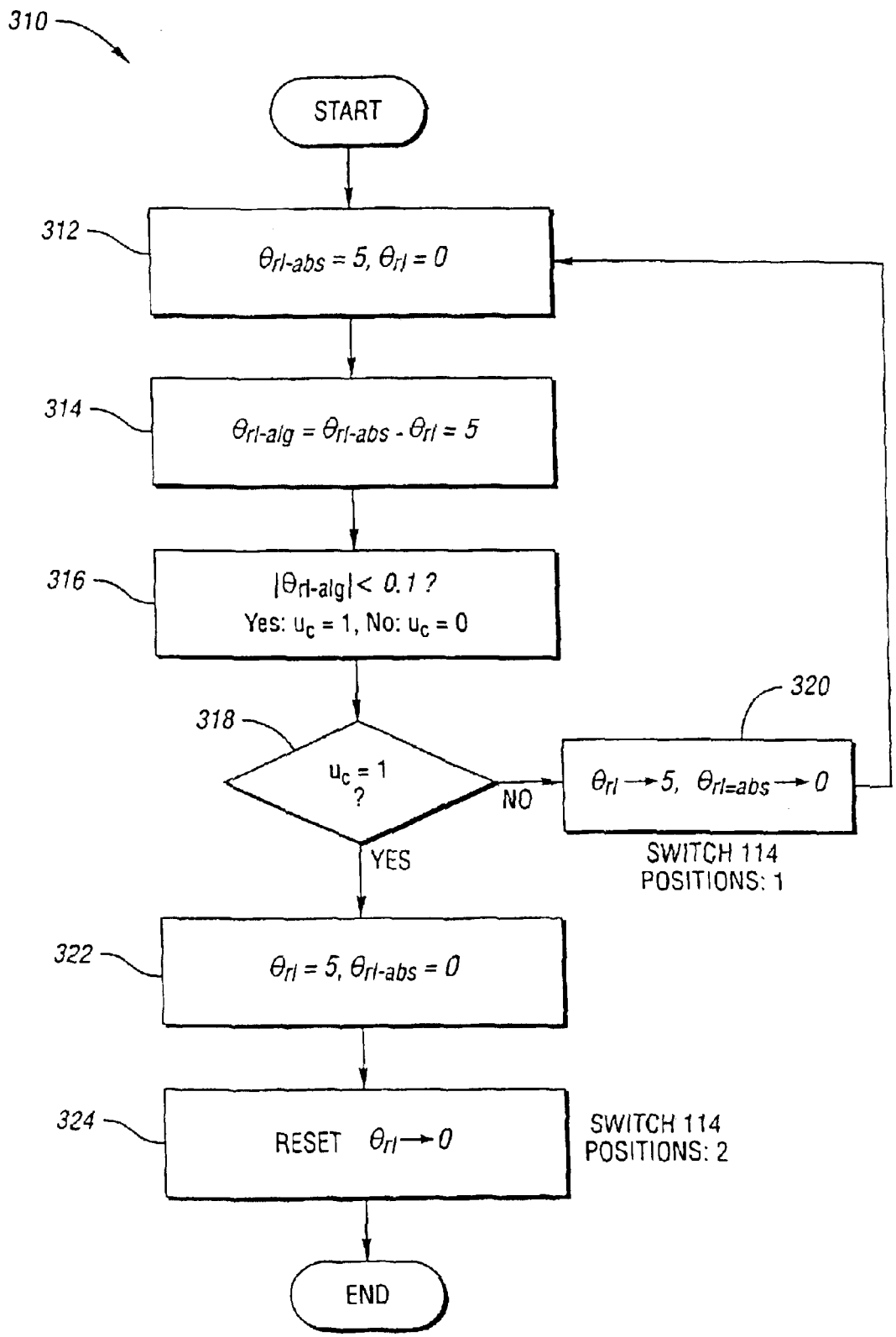
FIG. 4 is a flow chart diagram of an example to execute the real time initial alignment procedure.

An example to implement the real time initial alignment is given in FIG. 4 depicting method 310. The example method 310 provides an initial alignment procedure of the left road wheel. In the beginning of initial alignment, the relative left road wheel angle is $\theta_{rl}=0$ (degree) and absolute left road wheel angle is $\theta_{rl\text{-}abs}=5$ (degree) in box 312. Thus, the left road wheel aligning reference angle is given as $\theta_{rl\text{-}alg}=\theta_{rl\text{-}abs}-\theta_{refl}+\theta_{init}=5-0=5$ (degree) in box 314, where the desired aligning angular position $\theta_{init}=0$ (degree) such that the left road wheel will be straight after the initial alignment. The switch control signal $u_c$ is determined based the left road wheel aligning reference angle $\theta_{rl\text{-}alg}$ in boxes 316 and 318. If $|\theta_{rl\text{-}alg}|>\theta_{th}=0.1$, then $u_c=0$ in box 320. Thus, the left road wheel aligning reference angle $\theta_{rl\text{-}alg}$ is connected to the road wheel closed-loop control system to execute the initial alignment procedure. The road wheel closed-loop control system controls the left road wheel angle $\theta_{rl}$ to track the $\theta_{rl\text{-}alg}$. It is a process to make $\theta_{rl\text{-}abs}$ from 5 (degree) to 0 (degree), and $\theta_{rl}$ from 0 (degree) to 5 (degree). As soon as $\theta_{rl\text{-}alg}$ becomes less than the threshold, $|\theta_{rl\text{-}alg}|<\theta_{th}=0.1$, then $u_c=1$ in box 322. Thus, the left road wheel reference angle $\theta_{refl}$ is connected to the road wheel closed-loop control system. In this case, the left road wheel angle is reset to $\theta_{rl}=0$ (degree) and begins the normal steer-by-wire control in box 324.

Further aspects, features and advantages of the invention will become apparent from consideration of the following erudite description and the appended claims when taken in connection with the accompanying drawings.

What is claimed is:

1. A method of initial aligning wheels of a vehicle steer-by-wire system with two independent front road wheels in real time, the method comprising:

sensing absolute and relative steering wheel angles, absolute and relative left road wheel angles, and absolute and relative right road wheel angles;

generating wheel aligning reference angles including a steering wheel aligning reference angle, a left road wheel aligning reference angle, and a right road wheel aligning reference angle;

generating a switch control signal to determine operating states of the steer-by-wire system defining an initial alignment state and a nominal control state, the switch control signal being generated based on the steering wheel and road wheel aligning reference angles between the relative angles and absolute angles by using a logic operation with a switch threshold;

maintaining the initial alignment state wherein the steering wheel and road wheel aligning reference angles are connected to be input signals in the steer-by-wire control system, if one of the steering wheel aligning reference angle, the left road wheel aligning reference angle, and the right road wheel aligning reference angle is greater than the switch threshold between initial alignment state and nominal control state;

aligning the left road wheel, the right road wheel, and the steering wheel based on the steering wheel aligning reference angle, the lef: road wheel aligning reference angle, and the right road wheel aligning reference angle; and switching to the nominal control state wherein the steering wheel aligning reference angle, the left road wheel aligning reference angle, and the right road wheel aligning reference angle are connected to be input signals in the steer-by-wire control system, if the steering wheel aligning reference angle, the left road wheel aligning reference angle, and the right road wheel aligning reference angle is less then the switch threshold for the initial alignment state and nominal control state;

wherein the steering wheel aligning reference angle $\theta_{s\text{-}alg}$, the left road wheel aligning reference angle $\theta_{rl\text{-}alg}$, and the right road wheel aligning reference angle $\theta_{rr\text{-}alg}$ are given as:

$$\theta_{s\text{-}alg}=\theta_{s\text{-}abs}-\theta_s+\theta_{init}$$

$$\theta_{rl\text{-}alg}=\theta_{rl\text{-}abs}-\theta_{rl}+\theta_{init}$$

$$\theta_{rr\text{-}alg}=\theta_{rr\text{-}abs}-\theta_{rr}+\theta_{init}$$

where $\theta_{init}$ is a constant to represent the desired alignment angle, $\theta_s$ and $\theta_{s\text{-}abs}$ are relative and absolute steering wheel angles, $\theta_{rl}$ and $\theta_{rl\text{-}abs}$ are relative and absolute left road wheel angle, and $\theta_{rr}$ and $\theta_{rr\text{-}abs}$ are relative and absolute right road wheel angle.

2. The method of claim 1 further comprising:
providing a steering wheel control sub-system to generate road wheel reference angles and to produce steering feel for a vehicle driver;
providing a road wheel control sub-system to control actual road wheel angles to track road wheel reference angles; and
providing an initial alignment unit to align the road wheels and steering wheel, the initial alignment unit generating the wheel aligning reference angles to be input signals of the steer-by-wire system and a switch control signal to determine the operating states of steer-by-wire system, initial alignment unit including signal summing operators in communication with signal switches and a logic operation unit.

3. The method of claim 2 wherein the wheel aligning reference angles are determined by using signal summing operators in the initial alignment unit.

4. The method of claim 2 wherein signal switches in the initial alignment unit implements the signals switching between the steering wheel reference angle and steering wheel aligning reference angle, the left road wheel reference angle and left road wheel aligning reference angle, and the right road wheel reference angle and right road wheel aligning reference angle.

5. The method of claim 2 wherein the control signal of switches is provided by the logic operation unit the initial alignment unit, wherein the logic operation unit generates the switch control signal according to differences between the relative angles and absolute angles by using the logic operation.

6. The method of claim 5 wherein the logic operation determines whether the differences between the relative angles and absolute angles are larger or smaller than the switch threshold which represents a range near zero.

7. The method of claim 5 wherein the wheel aligning reference angles of the initial alignment unit are imputted to the steering wheel control sub-system and road wheel control sub-system, if the steering wheel aligning reference angle, the left road wheel aligning reference angle, and the right road wheel aligning reference angle are greater than the switch threshold.

8. The method of claim 5 wherein the wheel reference angles of the initial alignment unit are inputted to the steering wheel control sub-system and road wheel control sub-system, if the steering wheel aligning reference angle, the left road wheel aligning reference angle, and the right road wheel aligning reference angle are smaller than the switch threshold.

9. The method of claim 2 further comprising resetting the relative steering wheel angle, the left road wheel angle, and the right: road wheel angle, when the operating states of steer-by-wire system changes from the initial alignment state to nominal control state.

10. The method of claim 9 wherein the switch control signal in the initial alignment unit determines the operating states of steer-by-wire system.

11. The method of claim 1 wherein the real time initial alignment method only changes the reference input signals of the steering wheel control sub-system and the road wheel control sub-system, and the structure and parameters of the steering wheel control sub-system and road wheel control sub-system are not affected by the initial alignment.

12. The method of claim 1 wherein the return rates of the steering wheel and road wheels in the process of initial alignment can be adjusted by adjusting the gains of the steering wheel control sub-system and road wheel control sub-system.

13. A method of aligning wheels of a vehicle steer-by-wire system with two independent front road wheels in real time, the method comprising:
sensing absolute and relative steering wheel angles, absolute and relative left road wheel angles, and absolute and relative right road wheel angles;
generating a steering wheel aligning reference angle, a left road wheel aligning reference angle, and a right road wheel aligning reference angle;
maintaining the initial alignment state wherein the steering wheel aligning reference angle, the left road wheel aligning reference angle, and the right road wheel aligning reference angle are connected to be input signals in the steer-by-wire control system, if one of the steering wheel aligning reference angle, the left road wheel aligning reference angle, and the right road wheel aligning reference angle is greater than a switch threshold between initial alignment state and nominal control state; and
aligning the left road wheel, the right road wheel, and the steering wheel based on the steering wheel aligning reference angle, the left road wheel aligning reference angle, and the right road wheel aligning reference angle;
wherein the steering wheel aligning reference angle $\theta_{s\text{-}alg}$, the left road wheel aligning reference angle $\theta_{rl\text{-}alg}$, and the right road wheel aligning reference angle $\theta_{rr\text{-}alg}$, are given as:

$$\theta_{s\text{-}alg}=\theta_{s\text{-}abs}-\theta_s+\theta_{init}$$

$$\theta_{rf\text{-}alg}=\theta_{rf\text{-}abs}-\theta_{rf}+\theta_{init}$$

$$\theta_{rr\text{-}alg}=\theta_{rf\text{-}abs}-\theta_{rr}+\theta_{init}$$

where $\theta_{init}$ is a constant to represent the desired alignment angle, $\theta_s$ and $\theta_{s\text{-}abs}$ are relative and absolute steering wheel angles, $\theta_{rf}$ and $\theta_{rf\text{-}abs}$ are relative and absolute left road wheel angle, and $\theta_{rr}$ and $\theta_{rr\text{-}abs}$ are relative and absolute right road wheel angle.

14. A system of initial aligning wheels of a vehicle steer-by-wire system with two independent front road wheels in real time, the system comprising:
a steering wheel control sub-system to generate road wheel reference angles and to produce steering feel for a vehicle driver;
a road wheel control sub-system to control actual road wheel angles to track road wheel reference angles; and
an initial alignment unit to align the road wheels and steering wheel, the initial alignment unit generating a steering wheel aligning reference angle, a left road wheel aligning reference angle, and a right road wheel aligning reference angle to be the input signals of the steer-by-wire system and a switch control signal to determine the operating states of steer-by-wire system, the switch control signal being generated based on the steering wheel and road wheel aligning reference angles between the relative angles and absolute angles by using a logic operation with a switch threshold, and the initial alignment unit including the signal summing operators in communication with signal switches controlled by the switch control signal and a logic operation unit;

wherein the wheel aligning reference angles of the initial alignment unit are inputted to the steering wheel control sub-system and road whee control sub-system, if the steering wheel aligning reference angle, the left road wheel aligning reference angle, and the right road wheel aligning reference angle are greater than the switch threshold.

15. The system of claim 14 wherein the wheel reference angles of the initial alignment unit are inputted to the steering wheel control sub-system and road wheel control sub-system, if the steering wheel aligning reference angle, the left road wheel aligning reference angle, and the right road wheel aligning reference angle are smaller than the switch threshold.

16. The system of claim 14 wherein the steering wheel aligning reference angle $\theta_{s\text{-}alg}$, the left road wheel aligning reference angle $\theta_{rf\text{-}alg}$, and the right road wheel aligning reference angle $\theta_{rf\text{-}alg}$ are given as:

$$\theta_{s\text{-}alg} = \theta_{s\text{-}abs} - \theta_s + \theta_{init}$$

$$\theta_{rf\text{-}alg} = \theta_{rf\text{-}abs} - \theta_{rf} + \theta_{init}$$

$$\theta_{rr\text{-}alg} = \theta_{rr\text{-}abs} - \theta_{rr} + \theta_{init}$$

where $\theta_{unit}$ is a constant to represent the desired alignment angle, $\theta_s$ and $\theta_{s\text{-}abs}$ are relative and absolute steering wheel angles, $\theta_{rf}$ and $\theta_{rf\text{-}abs}$ are relative and absolute left road wheel angle, and $\theta_{rr}$ and $\theta_{rr\text{-}abs}$ are relative and absolute right road wheel angle.

* * * * *